Feb. 14, 1961 J. F. BYRD ET AL 2,972,022

NOISE SUPPRESSOR FOR THEATER SOUND REPRODUCTION

Filed Jan. 31, 1955

INVENTORS
JOHN F. BYRD &
CATALDO U. FALCO

BY

ATTORNEY 2,972,022

NOISE SUPPRESSOR FOR THEATER SOUND REPRODUCTION

John F. Byrd, Ashland, and Cataldo U. Falco, Merchantville, N.J., assignors to Radio Corporation of America, a corporation of Delaware Filed Jan. 31, 1955, Ser. No. 485,278

7 Claims. (Cl. 179—100.1)

Figure 1:
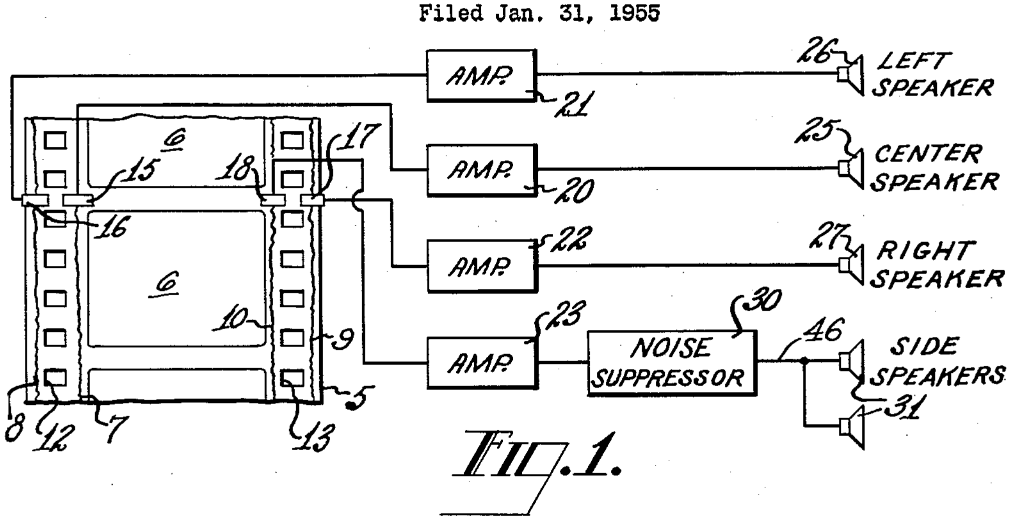

This invention relates to sound reproducing circuits, and particularly to a noise suppression circuit for use in theater sound reproduction.

The use of multiple sound tracks on motion picture film to provide stereophonic or directional effects is known, and recently such multiple sound tracks have been in the form of stripes of magnetic material located on each side of the two rows of sprocket holes. The signal on one of these stripes is reproduced in a speaker behind the center of a motion picture screen, another stripe is reproduced in a speaker at the left of the picture screen, and a third stripe is reproduced in a speaker at the right of the picture screen. The fourth magnetic stripe is generally of a narrower width than the other three stripes to prevent any detrimental reduction in picture size and is used to produce various types of effects. This magnetic track is usually reproduced in speakers located at the sides and/or rear of the theater.

Because of the narrowness of the stripe, the signal-to-noise ratio is much less than it is in the other wider magnetic tracks. Furthermore, since effects signals are not always being reproduced, the noise from the stripe can be disturbing at these times.

The present invention is directed to a multiple channel sound reproducing system whereby the effects speakers are disconnected during the times of no signal and are connected just prior to the reproduction of any particular sound effect. In this manner, there is no noise whatsoever emanating from the side speakers, but when an effects signal is present, the signal-to-noise ratio is sufficiently large to prevent the noise being heard. There are two important circuit features which make the present system commercial. The first is the use of a high frequency inaudible control signal or tone in the neighborhood of 12 kc. which is superimposed on the sound effects track to control the connection and disconnection of the effects speakers. This signal is impressed on the stripe just prior to the recording of the sound effects signal thereon. The second feature is that the control signal is amplified in the same manner as the signals from the other channels and is then fed into a noise suppressor unit connected to the side speakers. The control signal, without further amplification, but simply by use of a noise suppressor unit of shunt and series filter portions, actuates a relay to connect and disconnect the sound effects channel to and from its speakers. This eliminates the use of additional amplifiers, power supplies, and filters. The acceptor portion of the suppressor unit is a series resonant circuit which is tuned to transmit a control signal of a certain frequency, while the rejector portion of the unit is a low-pass filter to prevent the control signal from being transmitted but which passes the audio signal.

The principal object of the invention, therefore, is to facilitate the reproduction of multiple sound tracks in a plurality of speakers.

Another object of the invention is to provide an improved multiple channel sound reproducing system wherein the connection and disconnection of one of the channels to and from its speakers is automatically controlled.

A further object of the invention is to provide an improved plural magnetic track sound reproducing system in which a noise suppressor is interposed between the amplifiers and the speakers in a particular channel for connecting and disconnecting the channel to and from its speakers.

Figure 2:
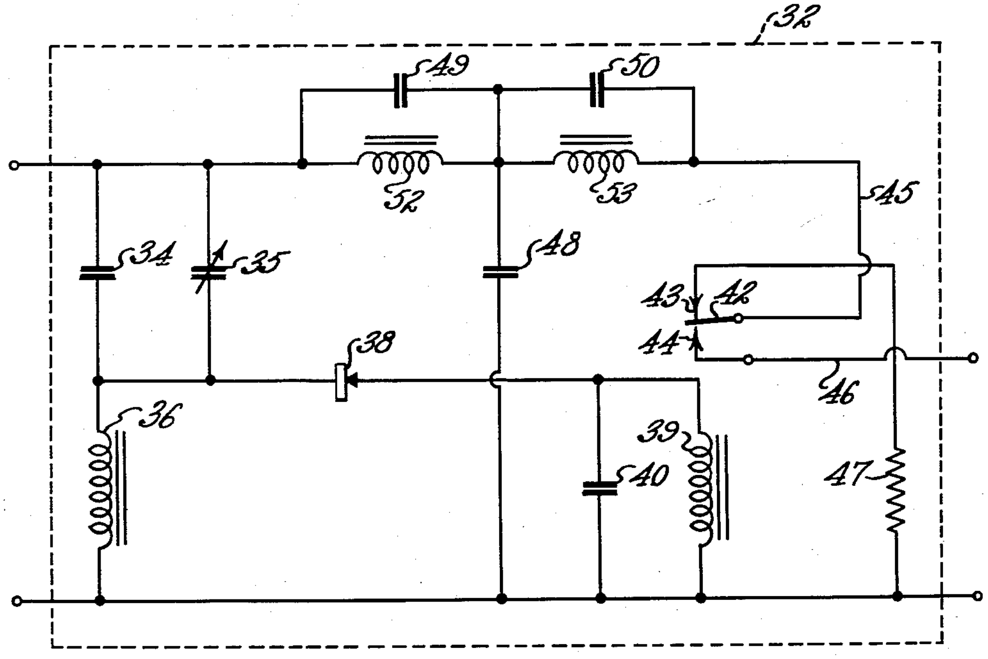

The novel features which are believed to be characteristic of this invention, both as to the manner of its organization and the mode of its operation, will be better understood from the following description when read in conjunction with the accompanying drawings, in which:

Fig. 1 is a block diagram showing a multi-track sound reproducing system embodying the invention; and Fig. 2 is a schematic circuit diagram of the noise suppressor unit used in the system of Fig. 1.

Referring now to the drawings, a section 5 of a multi-track film is shown with pictures 6 and four sound tracks 7, 8, 9, and 10. The sound tracks 7, 8, 9, and 10 may be in the form of magnetic stripes, or they may be photographic. Sound track 7 is located in the normal sound track position of motion picture film, sound tracks 8 and 9 are located between the sprocket holes 12 and 13 and the respective edges of the film, and sound track 10 is located between the pictures and the row of sprocket holes 13.

Considering the four sound tracks to be in magnetic stripes, they are detected by respective magnetic heads 15, 16, 17, and 18 in any well known manner. These heads are connected to respective amplifiers 20, 21, 22, and 23. The channel including head 15 and amplifier 20 is connected to a speaker 25 located behind the center of the picture screen, not shown, the channel including magnetic head 16 and amplifier 21 is connected to a speaker 26 located at the left side of the motion picture screen, and the channel including magnetic head 17 and amplifier 22 is connected to a speaker located at the right side of the picture screen. The fourth channel including magnetic head 18 and amplifier 23 is connected to a noise suppressor unit 30 and then over conductor 46 to a plurality of side speakers, as shown at 31.

As mentioned above, the three magnetic stripes 7, 8, and 9 may be of the same width, while magnetic stripe 10 is of a narrower width so as not to materially reduce the width of picture 6. This stripe 10 is used for sound effects which are not always present during the showing of portions of the pictures 6. Since this stripe is narrower than the other three stripes, the signal-to-noise ratio is lower than for the other three stripes, and, consequently, undesirable noise may emanate from the speakers 31. To prevent this noise, the suppressor unit 30, shown within the broken line 32 in Fig. 2, is utilized. This unit includes a control signal shunt filter including a fixed condenser 34, a variable condenser 35, and an inductance 36, which are tuned by condenser 35 to the frequency of the control signal on stripe 10, this signal being in the neighborhood of 12 kc. and which was recorded with the effects signal but slightly ahead of it.

Due to the high Q of this circuit, there is an increased voltage developed across inductance 36 which is rectified by a rectifier 38. This rectified current is impressed on a relay winding 39 shunted by condenser 40. Upon energization, the winding 39 attracts its armature 42, breaking contact 43 and making contact 44, which connects the conductor 45 to the conductor 46 connected to the side speakers 31. Upon de-energization, the armature 42 is released, breaking contact 44 and making contact 43 which connects conductor 45 to a resistor 47. Also included in the noise suppressor unit shown in Fig. 2 is a 12 kc. series filter having two "M" derived sections composed of condensers 48, 49, and 50, and two inductances 52 and 53. This filter section removes the 12 kc. control signal which would otherwise appear in the effects speakers 31 along with the effects signal which is transmitted therethrough. The curve of this series filter portion of the suppressor is much broader than the shunt circuit portion, and thus requires no field tuning adjustment.

Heretofore, suppressor units have been used in the low level circuits at approximately zero dbm, which required tubes for amplification of both signals with their necessary well filtered power supplies. The present system is simple by comparison since it requires no tubes or power supplies. This is made possible by using the full gain of the amplifier system rather than taking the voltage for operation at a lower level. The unit is very flexible, since it can be inserted anywhere in the effects speaker lines and therefore may be in the projection booth or in the theater auditorium. Compared with previous suppressors which were sensitive and complicated to install and adjust, this unit is simple, with only one adjustment, which is set for maximum direct current voltage across the relay when the 12 kc. loop is run in the magnetic soundhead. Compared with previous systems, it is particularly economical, introducing a saving in the neighborhood of 85% of previous systems.

Although the noise suppressor has been described in connection with a specific type of multiple channel sound reproducing system, it may also be used in other systems where sub-audible tones are superimposed on a single program track, each tone being used to connect and disconnect particular speakers.

We claim:

1. In a multi-channel sound reproducing system employing a plurality of parallel-positioned sound tracks, individual means for detecting each of said sound tracks separately, a plurality of amplifiers, each coupled to a different one of said detecting means, and at least one loudspeaker connected to each of said amplifiers, the combination of a filter connected between at least one of said amplifiers and its connected loudspeaker, said filter including a shunt portion as a series resonant circuit including a condenser and inductor for passing a certain signal from one of said sound tracks, a relay connected to said shunt portion and actuable by said signal passed by said shunt portion, actuation of said relay connecting and disconnecting said filter to and from its connected loudspeaker, and a resistor to which said filter is connected and disconnected alternately with the connection and disconnection of said filter to its said loudspeaker, said filter also including a series portion as a parallel resonant circuit including a condenser and inductor for rejecting said certain signal transmitted by said shunt portion, said shunt and series portions being interconnected as a unit.

2. A multi-channel sound reproducing system in accordance with claim 1 in which said certain signal on said one of said tracks is a superimposed high frequency control signal.

3. In a multi-channel sound reproducing system employing a plurality of parallel sound tracks of which a certain one contains a control tone and a sound signal, individual means for detecting each of said tracks separately, one of said means detecting said certain track containing said sound signal and said control tone, the combination therewith of a filter for transmitting said control tone and rejecting said sound signal contained in said certain track, a relay energized by said filter-transmitted control tone, a loudspeaker connectable to said filter by actuation of said relay by said control tone and disconnectable from said filter when said relay is de-energized by the discontinuance of said control tone, and a resistor connectable to and disconnectable from said filter alternately with the disconnecting and connecting of said loudspeaker to said filter.

4. A multi-channel sound reproducing system in accordance with claim 3 in which said filter has a portion consisting of a condenser and inductor connected in series for transmitting said control tone, and a portion consisting of a condenser and inductor connected in parallel to reject said control tone.

5. A record-actuated sound reproducing system comprising a record medium having a selected control signal and signals to be reproduced recorded on a single sound track thereof, pickup means positioned to convert the signals recorded on said sound track into corresponding electrical signals, a signal translating channel having its input connected to said pickup means, said signal translating channel including a filter network connected in series therein offering a high impedance to a signal frequency corresponding to that of said selected control signal and low impedance to signal frequencies corresponding to the signals to be reproduced, a resonant network connected in shunt to the input of said signal translating channel having a low impedance to signal frequencies corresponding to that of said selected control signal and high impedance to signal frequencies corresponding to the signals to be produced, loudspeaker means, a resistor, switch means connecting said loudspeaker means to the output of said signal translating channel in one condition of operation and disconnecting said loudspeaker means from said signal translating channel and connecting said signal translating channel to said resistor in a second condition of operation, and means for deriving a potential from said resonant network for determining the condition of operation of said switch means.

6. A record-actuated sound reproducing system comprising a record medium having recorded on a single sound track thereof a selected control signal intermixed with signals to be reproduced, pickup means positioned to convert the signals recorded on said sound track into corresponding electrical signals, a signal translating channel having its input connected to said pickup means, said signal translating channel including a filter network connected in series therein offering high impedance to a frequency corresponding to that of said selected control signal but low impedance to signal frequencies corresponding to those of said signals to be reproduced, a resonant network connected in shunt to the input of said signal translating channel having a low impedance to a frequency corresponding to that of said selected control signal but high impedance to signal frequencies corresponding to those of said signals to be reproduced, loudspeaker means, a resistor, switch means connecting said loudspeaker means to the output of said signal translating channel in a first condition of operation and disconnecting said loudspeaker means from said signal translating channel and connecting said signal translating channel to said resistor in a second condition of operation, means for deriving from said resonant network a potential representative of said selected control signal, and means operated by said potential to place said switch means in said first condition of operation, said switch means being in said second condition of operation in the absence of said potential.

7. A record-actuated sound reproducing system comprising a record medium having recorded on a single sound track thereof a selected control signal alternating with signals to be reproduced, pickup means positioned to convert the signals recorded on said sound track into corresponding electrical signals, a signal translating channel having its input connected to said pickup means, said signal translating channel including a filter network connected in series therein offering high impedance to a frequency corresponding to that of said selected control signal but offering low impedance to frequencies corresponding to those of said signals to be reproduced, a resonant network connected in shunt to the input of said signal translating channel having a low impedance to a frequency corresponding to that of said selected control signal but high impedance to frequencies corresponding to those of said signals to be reproduced, loudspeaker means, a resistor, switch means connecting said loudspeaker means to the output of said signal translating channel in a first condition of operation and disconnecting said loudspeaker means from said signal translating channel and connecting said signal translating channel to said resistor in a second condition of operation, means for deriving from said resonant network a potential representative of said selected control signal, and means operated by said potential to place said switch means in said second condition of operation, said switch means being in said first condition of operation in the absence of said potential.

References Cited in the file of this patent

UNITED STATES PATENTS

| | | |
|---|---|---|
| 1,642,710 | Affel | Sept. 20, 1927 |
| 2,065,489 | Etzrodt | Dec. 22, 1936 |
| 2,321,651 | Caraway | June 15, 1943 |
| 2,396,409 | Berzer | Mar. 12, 1946 |
| 2,714,633 | Fine | Aug. 22, 1955 |
| 2,841,654 | Athey et al. | July 1, 1958 |

UNITED STATES PATENT OFFICE

CERTIFICATION OF CORRECTION

Patent No. 2,972,022 February 14, 1961

John F. Byrd et al.

It is hereby certified that error appears in the above numbered patent requiring correction and that the said Letters Patent should read as corrected below.

Column 6, list of references cited, after line 11, add the following:

2,273,866 Holst et al.------Feb. 24, 1942

Signed and sealed this 22nd day of August 1961.

(SEAL)
Attest:

ERNEST W. SWIDER
Attesting Officer

DAVID L. LADD
Commissioner of Patents